US009963981B2

(12) United States Patent
Joshi et al.

(10) Patent No.: US 9,963,981 B2
(45) Date of Patent: May 8, 2018

(54) PITCH CHANGE MECHANISM FOR SHROUDED FAN WITH LOW FAN PRESSURE RATIO

(71) Applicant: General Electric Company, Schenectady, NY (US)

(72) Inventors: Narendra Digamber Joshi, Schenectady, NY (US); Michael Solomon Idelchik, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 464 days.

(21) Appl. No.: 14/735,260

(22) Filed: Jun. 10, 2015

(65) Prior Publication Data

US 2016/0363050 A1   Dec. 15, 2016

(51) Int. Cl.
| | |
|---|---|
| *F01D 7/00* | (2006.01) |
| *F02K 3/06* | (2006.01) |
| *F02K 3/075* | (2006.01) |
| *F02K 1/66* | (2006.01) |
| *F01D 15/10* | (2006.01) |

(52) U.S. Cl.
CPC .............. *F01D 7/00* (2013.01); *F01D 15/10* (2013.01); *F02K 1/66* (2013.01); *F02K 3/06* (2013.01); *F02K 3/075* (2013.01); *F05D 2220/32* (2013.01); *F05D 2220/327* (2013.01); *F05D 2220/36* (2013.01); *F05D 2220/768* (2013.01); *F05D 2240/51* (2013.01); *F05D 2260/74* (2013.01); *Y02T 50/672* (2013.01)

(58) Field of Classification Search
CPC ... F01D 15/10; F01D 7/00; F01D 7/02; F02K 1/66; F02K 3/06; F02K 3/075; F05D 2220/32; F05D 2220/327; F05D 2220/36; F05D 2220/768; F05D 2240/51; F05D 2240/74; Y02T 50/672
See application file for complete search history.

(56) References Cited

U.S. PATENT DOCUMENTS

| | | | | |
|---|---|---|---|---|
| 2,088,802 A | * | 8/1937 | McLaughlin | ......... B64C 11/001 416/126 |
| 2,366,795 A | * | 1/1945 | Lamoreaux | ........... B64C 11/001 416/145 |
| 2,425,904 A | * | 8/1947 | Vernon | .................... F02K 7/005 244/53 R |
| 2,835,332 A | * | 5/1958 | Fry | ......................... B64C 27/18 416/128 |
| 2,870,847 A | * | 1/1959 | Fry | ......................... B64C 11/48 416/128 |
| 2,945,672 A | * | 7/1960 | Wagner | .................... F01D 17/06 415/169.1 |

(Continued)

FOREIGN PATENT DOCUMENTS

| | | | | |
|---|---|---|---|---|
| WO | 2014143248 A1 | 9/2014 | | |
| WO | WO 20141/43305 | * 9/2014 | ............... | F01D 5/22 |

*Primary Examiner* — William McCalister
(74) *Attorney, Agent, or Firm* — Nitin N. Joshi (57) ABSTRACT

A shrouded fan assembly for use with a gas turbine engine includes a central hub and a plurality of variable-pitch fan blades coupled to and extending radially outward from the central hub. Each variable-pitch fan blade includes a radially outer tip is rotatable about a longitudinal axis extending therethrough. A shroud is coupled to each radially outer tip.

19 Claims, 5 Drawing Sheets

(56) References Cited

U.S. PATENT DOCUMENTS

| | | | | |
|---|---|---|---|---|
| 3,047,251 | A * | 7/1962 | Lewis | B64C 23/005 244/12.1 |
| 3,574,477 | A * | 4/1971 | Dolf | F02C 7/045 415/119 |
| 4,064,692 | A * | 12/1977 | Johnson | F02K 3/075 60/262 |
| 4,171,183 | A * | 10/1979 | Cornell | B64C 11/00 416/223 R |
| 4,767,270 | A * | 8/1988 | Seidel | B64C 11/001 416/129 |
| 4,929,158 | A * | 5/1990 | Girault | F01D 25/16 417/405 |
| 4,934,901 | A * | 6/1990 | Duchesneau | B64C 11/32 415/129 |
| 5,096,382 | A * | 3/1992 | Gratzer | B63H 1/16 416/189 |
| 5,431,533 | A * | 7/1995 | Hobbs | F01D 5/145 415/145 |
| 5,460,488 | A * | 10/1995 | Spear | F01D 5/22 416/191 |
| 5,490,764 | A * | 2/1996 | Schilling | F01D 5/16 416/239 |
| 5,778,659 | A * | 7/1998 | Duesler | F02K 1/09 239/265.27 |
| 5,791,138 | A * | 8/1998 | Lillibridge | F02C 7/045 60/262 |
| 6,004,095 | A * | 12/1999 | Waitz | B64C 21/025 415/115 |
| 7,931,439 | B2 * | 4/2011 | Bahadir | B64C 27/10 416/128 |
| 8,075,270 | B2 * | 12/2011 | Violette | F01D 7/00 416/148 |
| 2010/0196147 | A1 * | 8/2010 | Schilling | F01D 5/28 415/173.1 |
| 2011/0302907 | A1 * | 12/2011 | Murphy | F02K 1/06 60/226.3 |
| 2012/0110980 | A1 * | 5/2012 | Grabowski | F02C 9/16 60/226.1 |
| 2012/0243986 | A1 * | 9/2012 | Wiebe | F01D 15/10 415/229 |
| 2013/0216364 | A1 * | 8/2013 | Evans | F02C 7/04 415/182.1 |
| 2015/0037136 | A1 * | 2/2015 | Fairman | F01K 25/08 415/68 |
| 2015/0369046 | A1 * | 12/2015 | Roberge | F02K 3/06 60/805 |
| 2016/0363050 | A1 * | 12/2016 | Joshi | F01D 7/00 |
| 2016/0377091 | A1 * | 12/2016 | Cortequisse | F04D 29/023 415/193 |

* cited by examiner

PITCH CHANGE MECHANISM FOR SHROUDED FAN WITH LOW FAN PRESSURE RATIO

BACKGROUND

The subject matter described herein relates generally to gas turbine engines, and more specifically, to turbine engines having a low fan pressure ratio shrouded fan with a pitch change mechanism for increasing the efficiency of the gas turbine engine.

Known turbofan gas turbine engines used for powering an aircraft in flight typically include a fan assembly, a low pressure compressor, a high pressure compressor, a combustor, a high pressure turbine, and a low pressure turbine. The combustor generates combustion gases that are channeled to the high pressure turbine where they are expanded, driving the high pressure turbine, and then to the low pressure turbine where they are further expanded, driving the low pressure turbine. The high pressure turbine is coupled to the high pressure compressor by a high speed rotor shaft, and the low pressure turbine is coupled to both the fan assembly and the low pressure compressor by a low speed rotor shaft.

To increase efficiency of such known turbine engines, a large diameter fan assembly is desirable, which enables a higher bypass ratio to be used. However, the size of the fan assembly is dependent on the size of the turbine blades that drive the fan assembly. As the fan assembly size increases, the turbine size generally must also increase to maintain high efficiency. Furthermore, high bypass ratio turbofans suffer from large weight and drag penalties associated with their very large fan ducts. Moreover, the long fan blades on large fans are susceptible to flutter and inlet flow distortion, which results in unsteady loading of the fan blades.

BRIEF DESCRIPTION

In one aspect, a shrouded fan assembly for use with a gas turbine engine is provided. The fan assembly includes a central hub and a plurality of variable-pitch fan blades coupled to, and extending radially outward from, the central hub. Each variable-pitch fan blade of the plurality of variable-pitch fan blades includes a radially outer tip and is rotatable about a longitudinal axis extending therethrough. Furthermore, the fan assembly includes a shroud coupled to each radially outer tip.

In another aspect, a gas turbine engine is provided. The gas turbine engine includes a central hub and a fan assembly having a plurality of variable-pitch fan blades coupled to the central hub. Each variable-pitch fan blade of the plurality of variable-pitch fan blades includes a radially outer tip and is rotatable about a longitudinal axis extending therethrough. The gas turbine engine also includes a shroud extending around the fan assembly. Each variable-pitch fan blade of the plurality of variable-pitch fan blades is coupled to the shroud at the radially outer tip. Furthermore, the gas turbine engine includes a nacelle surrounding the shroud. The nacelle includes a fan case at least partially extending about the shroud.

In yet another aspect, a gas turbine engine is provided. The gas turbine engine includes a fan assembly having a plurality of radially outward extending fan blades including a radially outer tip and coupled to a central hub. The gas turbine engine also includes a shroud at least partially extending about the fan assembly. Each fan blade of the plurality of fan blades is coupled to the shroud at the radially outer tip. The gas turbine engine includes a nacelle having a fan case extending about the shroud. Moreover, the gas turbine engine includes a power generator coupled to at least the shroud.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal axis of a gas turbine engine. The terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine. Moreover, "upstream" refers to a forward end of the gas turbine engine, and "downstream" refers to an aft end of the gas turbine engine.

As used herein, the term "core engine" is used to refer to that portion of the gas turbine engine extending from the high pressure compressor forward flange back to the inlet of the low pressure turbine. The core engine includes both the engine casing or stator and the rotating components positioned radially inwardly from the stator.

The gas turbine engine systems described herein facilitate increasing the efficiency of the gas turbine engine by disclosing fan having a low fan pressure ratio and disposed in a nacelle to produce thrust for an aircraft application. Each of the variable-pitch fan blades of the fan are rotatably coupled about their longitudinal axis to a fan hub through a pitch change mechanism. The pitch change mechanism enables the control system of the gas turbine engine to rotate each of the variable-pitch fan blades about its own respective axis to facilitate adjusting thrust requirements, including thrust reversal. A fan shroud is provided around the variable-pitch fan blades. Each of the variable-pitch fan blades are coupled to the shroud at a rotatable joint to enable the variable-pitch fan blades to rotate around their individual longitudinal axes. Furthermore, the shroud supports the blade tips to each respective fan blade's response to flutter. Thus, the shroud enables the variable-pitch fan assembly to have a more robust mechanical design, while enabling the length of the nacelle to be shortened and eliminating the traditional thrust reverse mechanism generally coupled to the nacelle. This further affects the efficiency of the gas turbine engine by reducing the weight and the drag of the gas turbine engine. As such, the embodiments described herein provide for reducing fuel consumed by the gas turbine engine during operation. Furthermore, the embodiments described herein provide for reducing the size of the nacelle, eliminating the thrust reverse mechanism coupled to the nacelle, and in some embodiments, eliminating the nacelle entirely. In addition, the embodiments described herein provide for the variable-pitch fan blades being made lighter, due to the added support at both ends, which facilitates making the variable-pitch fan blades less responsive to flutter and inlet distortion.

Although generally described herein with respect to an aircraft gas turbine engine, the methods and systems described are applicable to any type or form of gas turbine engine, for example, without limitation, turbojets, turbofans, and other turbine engines that require an inlet fan assembly.

Figure 1:
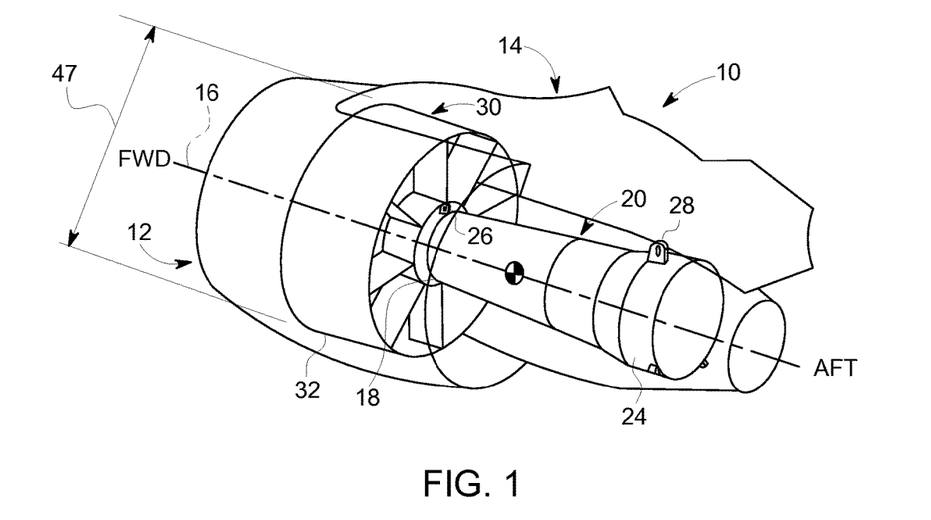
FIG. 1 is a schematic view of an aircraft gas turbine engine mounted within a nacelle and mounted to an aircraft by a mounting structure or pylon.

FIG. 1 is a schematic view of an aircraft gas turbine engine 10 mounted within a nacelle, generally indicated at 12, and mounted to an aircraft (not shown) by a mounting structure or pylon, generally indicated at 14. In the exemplary embodiment, gas turbine engine 10 is generally disposed about an engine centerline 16. Gas turbine engine 10 has a forward or fan hub frame 18 that is coupled to a backbone structure or core engine 20, such that fan hub frame 18 is substantially coaxial with core engine 20 about engine centerline 16. In the exemplary embodiment, gas turbine engine 10 includes a fan assembly 30 coupled to fan hub frame 18. Fan assembly 30 has a fan diameter 47 that is measured substantially perpendicular to engine centerline 16. In the exemplary embodiment, fan assembly 30 includes a shroud 64 (shown in FIGS. 2-5) radially spaced from fan hub frame 18.

Core engine 20 is further coupled to an aft or turbine frame 24. Gas turbine engine 10 is coupled to pylon 14, which generally extends downwardly from a wing of the aircraft (not shown) at a forward mount 26 on fan hub frame 18 and at an aft mount 28 on turbine frame 24. Alternatively, forward mount 26 is coupled to any portion of gas turbine engine 10 that enables forward mount 26 to function as described herein, for example, without limitation, a fan case 32.

Figure 2:
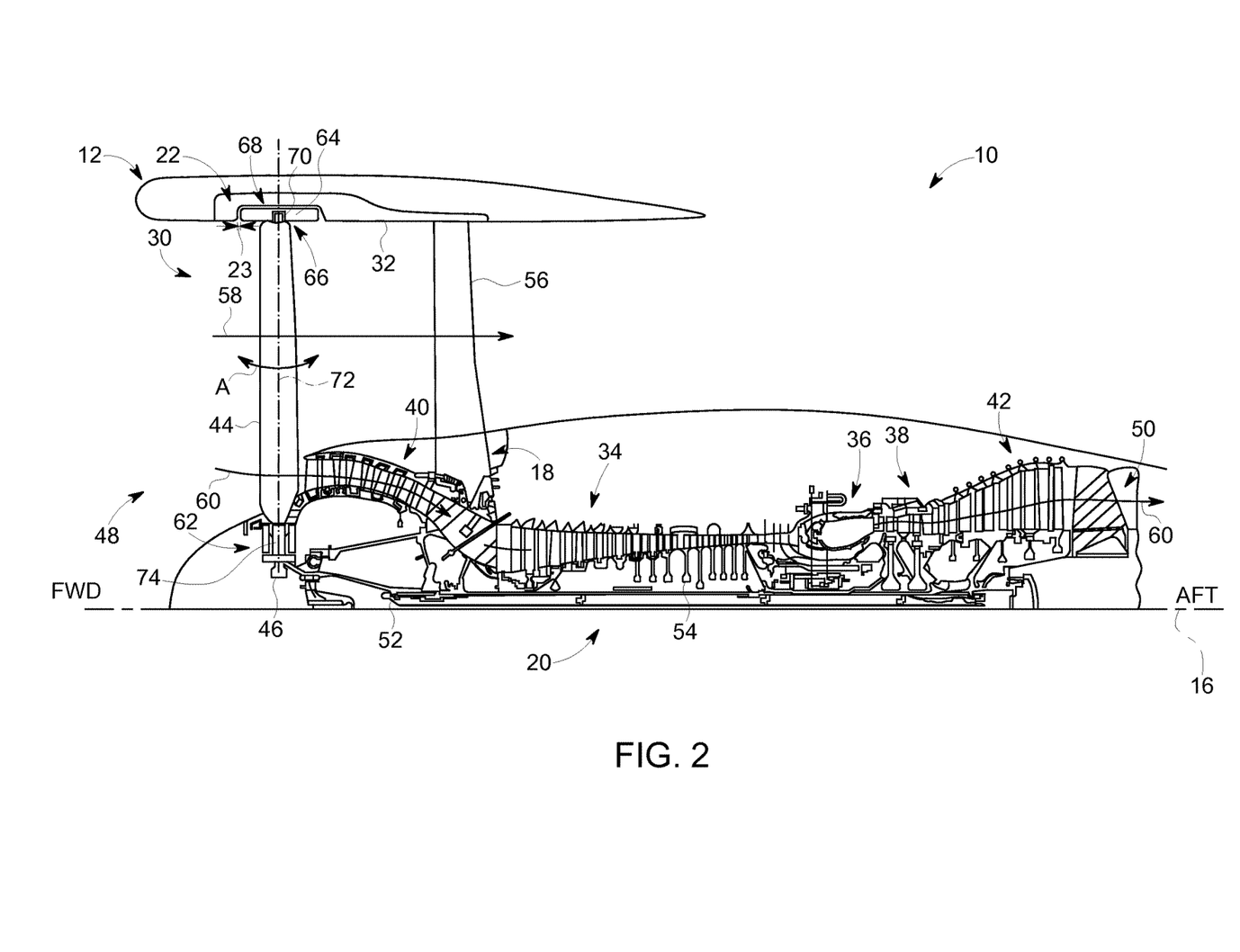
FIG. 2 is a sectional schematic view of the gas turbine engine shown in FIG. 1.

FIG. 2 is a sectional schematic view of gas turbine engine 10. In the exemplary embodiment, gas turbine engine 10 includes core engine 20 having, in serial flow relationship, a high pressure compressor 34, a combustor 36 downstream from high pressure compressor 34, and a high pressure turbine 38 downstream from combustor 36. Gas turbine engine 10 is, for example, without limitation, a two or three spool type gas turbine engine and includes a low pressure compressor 40 coupled together with fan assembly 30, and a low pressure turbine 42.

In the exemplary embodiment, fan assembly 30 is a low fan pressure ratio shrouded fan assembly that includes an array of variable-pitch fan blades 44 extending radially outward from a rotor or central hub 46. As used herein, the phrase "fan pressure ratio" is the pressure ratio across the fan blade, and "low fan pressure ratio" is typically less than 2.0. In the exemplary embodiment, fan assembly is a large diameter fan assembly, meaning variable-pitch fan blades 44 extend from central hub 46 to define fan diameter 47 that is larger than typical fan diameters, e.g., fan diameter 47 is at least 1.5 m (60 in.). In alternate embodiments, fan assembly 30 has any diameter suitable to enable gas turbine engine 10 to function as described herein.

In the exemplary embodiment, fan assembly 30 further includes fan hub frame 18 having a plurality of outlet guide vanes 56 that extend radially outward to fan case 32. Gas turbine engine 10 has an inlet assembly 48 and an exhaust 50 downstream from inlet assembly 48. Fan assembly 30 and low pressure compressor 40 are coupled by a low speed rotor shaft 52, and high pressure compressor 34 and high pressure turbine 38 are coupled by a high speed rotor shaft 54.

In operation, fan assembly 30 is driven by low speed rotor shaft 52 and drives air (not shown) along a bypass flow path 58. In addition, fan assembly 30 drives air along a flow path 60 into low pressure compressor 40 where the air is compressed and channeled to combustor 36. In combustor 36, the compressed air is mixed with fuel and burned to generate an exhaust gas flow (not shown) that is expanded through high pressure turbine 38 and low pressure turbine 42. The energy extracted from the expansion of the exhaust gas flow is used, in part, to rotate low speed rotor shaft 52, which drives fan assembly 30 and low pressure compressor 40.

In the exemplary embodiment, fan blades 44 extend radially from central hub 46, which is coupled to low speed rotor shaft 52. Fan blades 44 have an airfoil shape in cross-section. Alternatively, fan blades 44 have any cross-sectional shape that enables gas turbine engine 10 to function as described herein. In a traditional gas turbine engine, fan blades 44 are immoveable and are fixedly coupled to central hub 46. In the exemplary embodiment, however, fan blades 44 are rotatable about a rotation axis 72, as indicated by arrow A. As shown in FIG. 2, fan blades 44 include a shaft portion 74 disposed on the innermost radial end and a tip pin 70 disposed on the outermost radial end, concentric with rotation axis 72. In one embodiment, fan blades 44 are hollow titanium or titanium alloy blades. In another embodiment, fan blades 44 are composite blades. Alternatively, fan blades 44 are fabricated from any material or combination of materials that enable gas turbine engine 10 to function as described herein.

Also, in the exemplary embodiment, as shown in FIG. 1, gas turbine engine 10 includes a pitch adjustment system 62 coupled in driving engagement with fan assembly 30, and more specifically, with shaft portion 74 of each fan blade 44. Pitch adjustment system 62 is coupled to a control system (not shown) of gas turbine engine 10 and is configured to adjust a pitch of fan blades 44. Pitch adjustment system 62 facilitates changing the pitch of fan blades 44 relative to the air passing along bypass flow path 58 as indicated by arrow A, to vary thrust forces generated by fan assembly 30. In the exemplary embodiment, pitch adjustment system 62 enables fan blades 44 to be set at a positive angle of attack to generate forward thrust. For thrust reversal, pitch adjustment system 62 is used to set fan blades 44 at a negative angle of attack so that a rearward thrust is generated.

Further, in the exemplary embodiment, shroud 64 is coupled to radially outer tips 66 of fan blades 44. Shroud 64 is formed as an annular ring and includes equispaced holes 68 positioned to accept a tip pin 70 of each fan blade 44. Holes 68 in shroud 64 are sized to receive a bearing (not shown) configured to receive tip pin 70 of fan blade 44, thereby facilitating the rotation of fan blade 44 with respect to shroud 64. In the exemplary embodiment, shroud 64 is fabricated from the same material as fan blades 44. For example, without limitation, in one embodiment shroud 64 is metallic and is fabricated from titanium or a titanium alloy. In another embodiment, shroud 64 is fabricated from a composite material. Alternatively, shroud 64 is fabricated from any material or combination of materials that enable shroud 64 to function as described herein.

In the exemplary embodiment, shroud 64 and fan case 32 are separated by a tight clearance fit 23 to facilitate shroud 64 rotating. In the illustrated embodiment, shroud 64 is recessed into an annular groove 22 formed in fan case 32. Annular groove 22 is slightly larger than shroud 64 thereby forming tight clearance fit 23. Alternatively, fan case 32 does not include annular groove 22, and shroud 64 is spaced radially inward from fan case 32 to form tight clearance fit 23. In one embodiment, the tight clearance fit 23 is in the range between about 0.25 millimeters (mm) (0.010 inches) to about 2.54 mm (0.100 inches). In alternate embodiments, shroud 64 and fan case 32 are separated by any tight clearance fit 23 suitable for fan assembly 30 to function as described herein. In operation, fan assembly 30 acts to pull air into gas turbine engine 10 as fan blades 44 and shroud 64 rotate about engine centerline 16.

During operation, air flows axially through nacelle 12 and fan assembly 30 along bypass flow path 58 and flow path 60, generally in a direction that is substantially parallel to engine centerline 16, which extends through gas turbine engine 10. The air is supplied to low pressure compressor 40 along flow path 60 where it is compressed a first amount and directed to high pressure compressor 34. High pressure compressor 34 further compresses the air and delivers it to combustor 36 where it is burned with a fuel (not shown) to generate a combustion gas flow that continues along flow path 60. The combustion gas flow from combustor 36 is directed to high pressure turbine 38, and is further directed to low pressure turbine 42, where it generates a torque load (not shown). High pressure turbine 38 drives high pressure compressor 34 by way of high speed rotor shaft 54 and low pressure turbine 42 drives fan assembly 30 by way of low speed rotor shaft 52. In addition, the air entering nacelle 12 is compressed and exhausted through nacelle 12 by fan assembly 30, where it generates a thrust load (not shown). The pitch, or angle of attack, of fan blades 44 is adjusted as required to adjust the thrust load.

Figure 3:
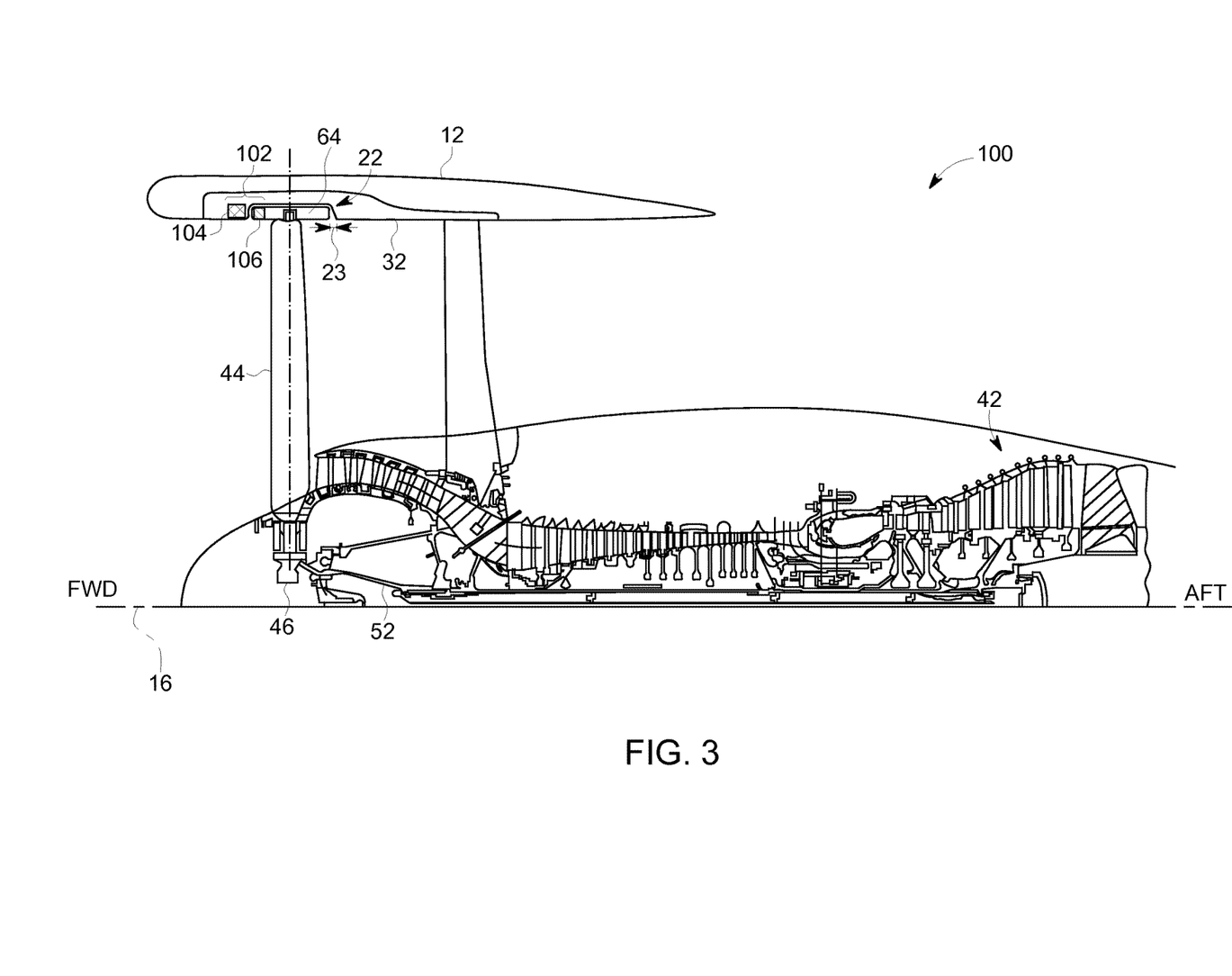
FIG. 3 is a sectional schematic view of an alternative embodiment of the gas turbine engine shown in FIG. 1.

FIG. 3 is a sectional schematic view of an alternative embodiment of a gas turbine engine 100. In the illustrated embodiment of FIG. 3, gas turbine engine 100 includes a magnetic thrust bearing assembly 102 coupled between shroud 64 and fan case 32 in nacelle 12. Magnetic thrust bearing assembly 102 employs a single control axis, which in the exemplary embodiment is along the direction of engine centerline 16. Magnetic thrust bearing assembly 102 includes a stator electromagnet 104 and a rotor 106. In the exemplary embodiment, stator electromagnet 104 is formed as an annular ring and is coupled to a portion of fan case 32 forward of shroud 64. Rotor 106 is coupled to shroud 64, and in particular, a forward portion of shroud 64 adjacent stator electromagnet 104. Alternatively, shroud 64 functions as the rotor portion of magnetic thrust bearing assembly 102, i.e., shroud 64 is fabricated from a soft, magnetically permeable material that is attracted to or repelled from stator electromagnet 104. During operation of fan assembly 30, shroud 64 functions as a thrust type load against magnetic thrust bearing assembly 102.

In the exemplary embodiment, stator electromagnet 104 includes an annular stator having rotor disc facing slots (not shown) containing electrically energizable windings (not shown). Stator electromagnet 104 and rotor 106 are formed of a soft, magnetically permeable material. Stator electromagnet 104 extends circumferentially about rotor 106 and generates an electromagnetic field extending generally parallel to engine centerline 16. By controlling the strength of the electromagnetic fields produced by stator electromagnet 104, rotor 106 (and thus shroud 64) is supported axially against thrust loads generated by fan assembly 30, thereby facilitating preventing shroud 64 from making contact with adjacent fan case 32 structure. The electromagnetic fields can also be modified to attract rotor 106 when the pitch of fan blades 44 is negative to generate a thrust reversal force. In an alternative embodiment, a second magnetic thrust bearing is coupled to a portion of fan case 32 aft of shroud 64 to facilitate axially suspending shroud 64 between each magnetic thrust bearing. In such an embodiment, the electromagnetic fields are adjusted to maintain the position of shroud 64 whether fan assembly 30 is generating thrust or thrust reversal forces.

Figure 4:
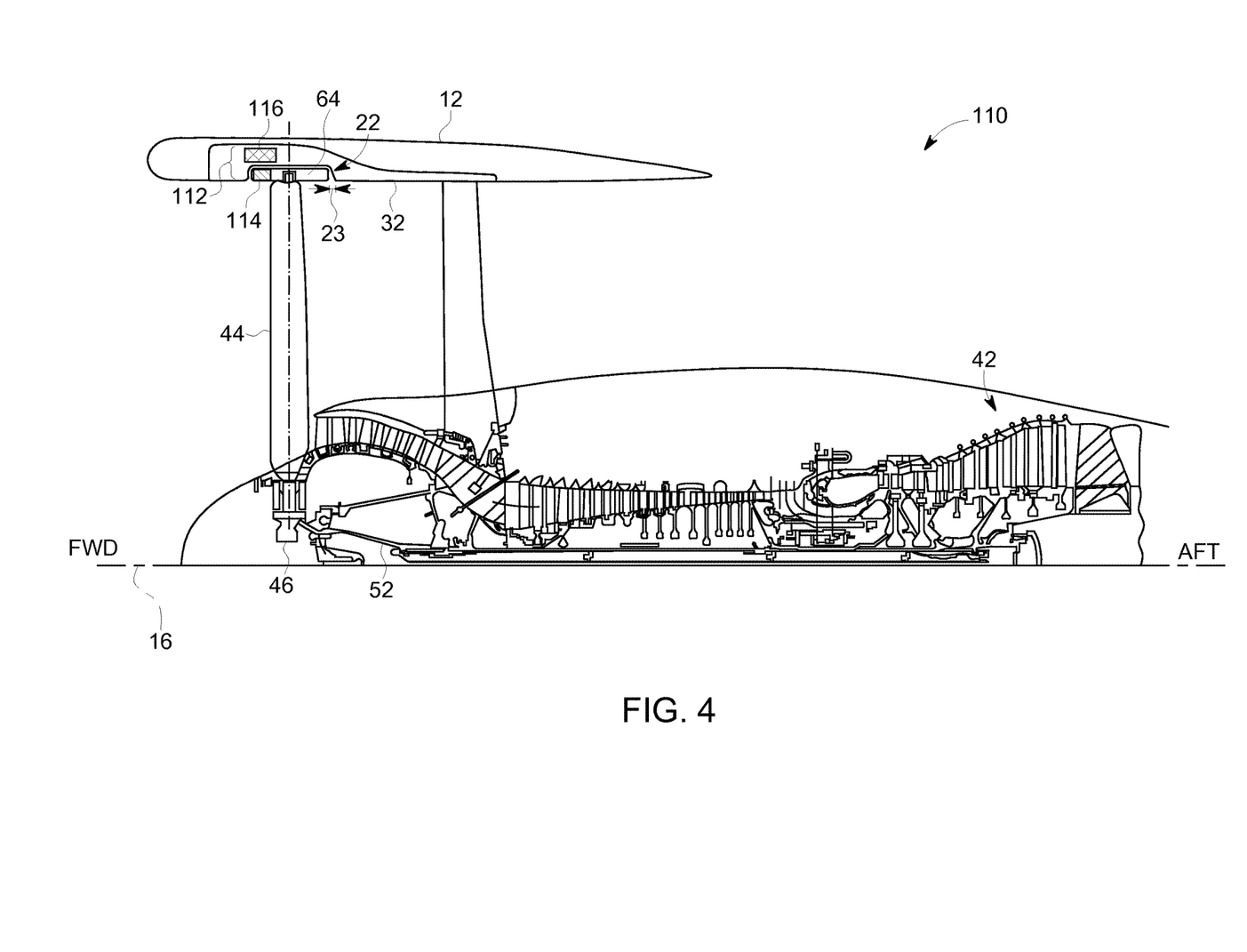
FIG. 4 is a sectional schematic view of another alternative embodiment of the gas turbine engine shown in FIG. 1.

FIG. 4 is a sectional schematic view of another alternative embodiment of a gas turbine engine 110. In the illustrated embodiment of FIG. 4, gas turbine engine 110 includes a power generator 112. In the exemplary embodiment, power generator 112 is a permanent magnet alternator ("PMA") or a permanent magnet generator ("PMG"). In alternative embodiments, power generator is any type of generator suitable for gas turbine engine 110 to function as described herein, e.g., an induction generator and variable reluctance generator. In the illustrated embodiment, as shown in FIG. 4, power generator 112 is integrated into nacelle 12. In the exemplary embodiment, power generator 112 includes a rotor portion 114 and a stator portion 116. Rotor portion 114 is coupled to shroud 64, and thus rotates with rotation of the low speed rotor shaft 52. Stator portion 116 is fixed relative to rotor portion 114, and is coupled to fan case 32, radially surrounding rotor portion 114.

During operation of gas turbine engine 110, low speed rotor shaft 52 rotates in response to rotation of low pressure turbine 42. Rotor portion 114 likewise rotates along with low speed rotor shaft 52 relative to stator portion 116. Stator portion 116 is a permanent magnet and rotor portion 114 includes conductive wire coils (not shown), or, in an alternative embodiment, stator portion 116 includes conductive wire coils and rotor portion 114 is a permanent magnet. In either embodiment, the rotation of rotor portion 114 relative to stator portion 116 facilitates converting mechanical rotation energy into electrical energy, thereby generating electrical power. The generated electrical power can be used by the control system (not shown) of gas turbine engine 110 to provide electrical power to various components of gas turbine engine 110 and the aircraft (not shown).

Figure 5:
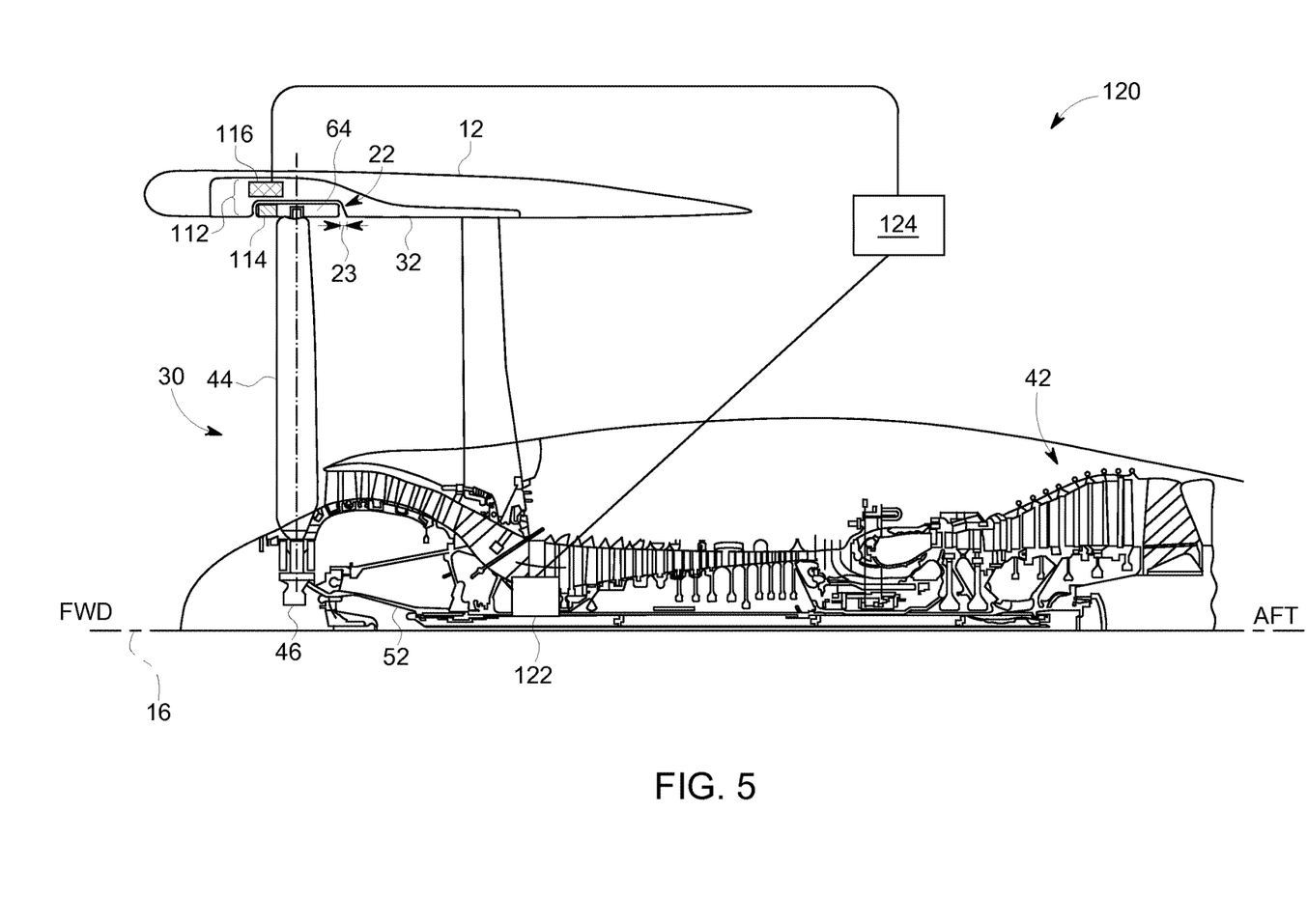
FIG. 5 is a sectional schematic view of another alternative embodiment of the gas turbine engine shown in FIG. 1.

FIG. 5 is a sectional schematic view of another alternative embodiment of a gas turbine engine 120. In the illustrated embodiment of FIG. 5, gas turbine engine 120 includes a high speed generator 122 and an electronic control 124. In the exemplary embodiment, electronic control 124 is a bidirectional control that facilitates power generator 112 functioning as a motor. Power generator 112 and high speed generator 122 are coupled to electronic control 124 such that electrical power generated by high speed generator 122 is transferred to power generator 112. During operation of gas turbine engine 120, high speed generator 122 generates electrical power that loads up the higher speed core at cruise. A portion of the generated power is directed by electronic control 124 to power generator 112. When receiving the generated power, power generator 112 functions as a motor and utilizes the electrical power to provide rotational power to fan assembly 30. As a result, gas turbine engine 120 has an increased operating pressure ratio and improved efficiency.

The embodiments described herein enable increasing the efficiency of a gas turbine engine by increasing a mass flow of air using a large low fan pressure ratio fan. The large low fan pressure ratio fan includes shrouded variable-pitch fan blades, which includes a more robust mechanical design, and enables the length of the nacelle to be shortened; thereby eliminating the traditional thrust reverse mechanism generally coupled to the nacelle. As such, the embodiments described herein provide for reducing an amount of fuel consumed by the gas turbine engine during operation. Furthermore, the embodiments described herein provide for reducing the size of the nacelle, eliminating the thrust reverse mechanism coupled to the nacelle, and in some embodiments, eliminating the nacelle entirely. In addition, the embodiments described herein provide for the fan blades being made lighter, due to the added support at both ends, which facilitates making the fan blades less responsive to flutter and inlet distortions in the nacelle.

An exemplary technical effect of the embodiments described herein includes at least one of: (a) facilitating the rotation of fans blades of a large diameter fan with a fan pitch change mechanism to match thrust load settings, including thrust reverse, of a gas turbine engine; (b) facilitating the generation of electrical power by coupling a generator to the shroud of the fan and the fan case, and (c) countering the axial thrust of the fan by coupling a magnetic thrust bearing between the fan shroud and the fan case.

Exemplary embodiments of a low fan pressure ratio shrouded fan with pitch change mechanism for increasing gas turbine engine efficiency are described above in detail. The apparatus and systems described herein are not limited to the specific embodiments described, but rather, components of the apparatus and systems may be utilized independently and separately from other components described herein. For example, the low fan pressure ratio shrouded fan with pitch change mechanism may also be used in combination with other turbine engine systems, and is not limited to practice with only the systems described herein. Rather, the exemplary embodiments can be implemented and utilized in connection with many turbine machine system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shrouded fan assembly for use with a gas turbine engine, said shrouded fan assembly comprising:
   a central hub;
   a plurality of variable-pitch fan blades coupled to, and extending radially outward from, said central hub, each variable-pitch fan blade of said plurality of variable-pitch fan blades comprising a radially outer tip and being rotatable about a longitudinal axis extending therethrough;
   a shroud coupled to each said radially outer tip; and
   at least one magnetic thrust bearing coupled to said shroud and a fan case, wherein said at least one magnetic thrust bearing comprises a first magnetic thrust bearing coupled to said fan case forward of said shroud and a second magnetic thrust bearing coupled to said fan case aft of said shroud, said first and second magnetic thrust bearings configured to axially suspend said shroud therebetween.

2. The shrouded fan assembly in accordance with claim 1, wherein said each variable-pitch fan blade further comprises a tip pin extending radially outward from said radially outer tip and concentric with the longitudinal axis, said shroud defining a plurality of holes, each hole of said plurality of holes receiving a respective said tip pin.

3. The shrouded fan assembly in accordance with claim 2, wherein said shroud further comprises a bearing disposed in said each hole, each said bearing configured to receive a respective said tip pin.

4. The shrouded fan assembly in accordance with claim 1, wherein said shroud is metallic.

5. The shrouded fan assembly in accordance with claim 4, wherein said shroud is at least one of titanium and a titanium alloy.

6. The shrouded fan assembly in accordance with claim 1, wherein said shroud is fabricated from a composite material.

7. A gas turbine engine comprising:
   a central hub;
   a fan assembly comprising a plurality of variable-pitch fan blades coupled to said central hub, each variable-pitch fan blade of said plurality of variable-pitch fan blades comprising a radially outer tip and being rotatable about a longitudinal axis extending therethrough;
   a shroud extending around said fan assembly, said each variable-pitch fan blade coupled to said shroud at said radially outer tip;
   a nacelle surrounding said shroud, said nacelle comprising a fan case at least partially extending about said shroud; and at least one magnetic thrust bearing coupled to said shroud and said fan case, wherein said at least one magnetic thrust bearing comprises a first magnetic thrust bearing coupled to said fan case forward of said shroud and a second magnetic thrust bearing coupled to said fan case aft of said shroud, said first and second magnetic thrust bearings configured to axially suspend said shroud therebetween.

8. The gas turbine engine in accordance with claim 7, wherein said shroud is spaced from said fan case by a clearance fit.

9. The gas turbine engine in accordance with claim 8, wherein the clearance fit is in the range between about 0.25 mm (0.010 inches) to about 2.54 mm (0.100 inches).

10. The gas turbine engine in accordance with claim 7, wherein said magnetic thrust bearing comprises:
   a stator electromagnet coupled to a portion of said fan case; and
   a rotor portion coupled to said shroud in opposing relationship to said stator electromagnet.

11. The gas turbine engine in accordance with claim 7, wherein said stator electromagnet is an annular ring fabricated from a magnetically permeable material.

12. The gas turbine engine in accordance with claim 7, wherein said rotor portion is an annular ring fabricated from a magnetically permeable material.

13. A gas turbine engine comprising:
   a fan assembly comprising a plurality of radially outward extending variable-pitch fan blades comprising a radially outer tip, said plurality of radially outward extending fan blades coupled to a central hub;
   a shroud at least partially extending about said fan assembly, each fan blade of said plurality of fan blades coupled to said shroud at said radially outer tip;
   a nacelle comprising a fan case extending about said shroud;
   a power generator coupled to said shroud; and
   at least one magnetic thrust bearing coupled to at least one of said shroud and said fan case, wherein said at least one magnetic thrust bearing comprises a first magnetic thrust bearing coupled to said fan case forward of said shroud and a second magnetic thrust bearing coupled to said fan case aft of said shroud, said first and second magnetic thrust bearings configured to axially suspend said shroud therebetween.

14. The gas turbine engine in accordance with claim 13, wherein said power generator is one of a permanent magnet alternator and a permanent magnet generator.

15. The gas turbine engine in accordance with claim 13, wherein said power generator comprises:
   a stator portion coupled to said fan case, said stator portion disposed radially outward of said shroud; and
   a rotor portion coupled to said shroud.

16. The gas turbine engine in accordance with claim 15, wherein said stator portion comprises a permanent magnet.

17. The gas turbine engine in accordance with claim 15, wherein said rotor portion comprises a permanent magnet.

18. The gas turbine engine in accordance with claim 13 further comprising a high speed generator and an electronic control, wherein said power generator functions as a motor and said electronic control is a bidirectional controller that facilitates said power generator functioning as a motor, the electronic control coupled to said power generator and to said high speed generator such that power is transferred from said high speed generator to said power generator.

19. The gas turbine engine in accordance with claim 18 wherein said power generator provides rotational power to said fan assembly when said power generator is functioning as a motor.

* * * * *